May 2, 1944.   E. A. KEELER   2,348,177
MEASURING AND CONTROL APPARATUS
Filed Jan. 17, 1939   2 Sheets-Sheet 1
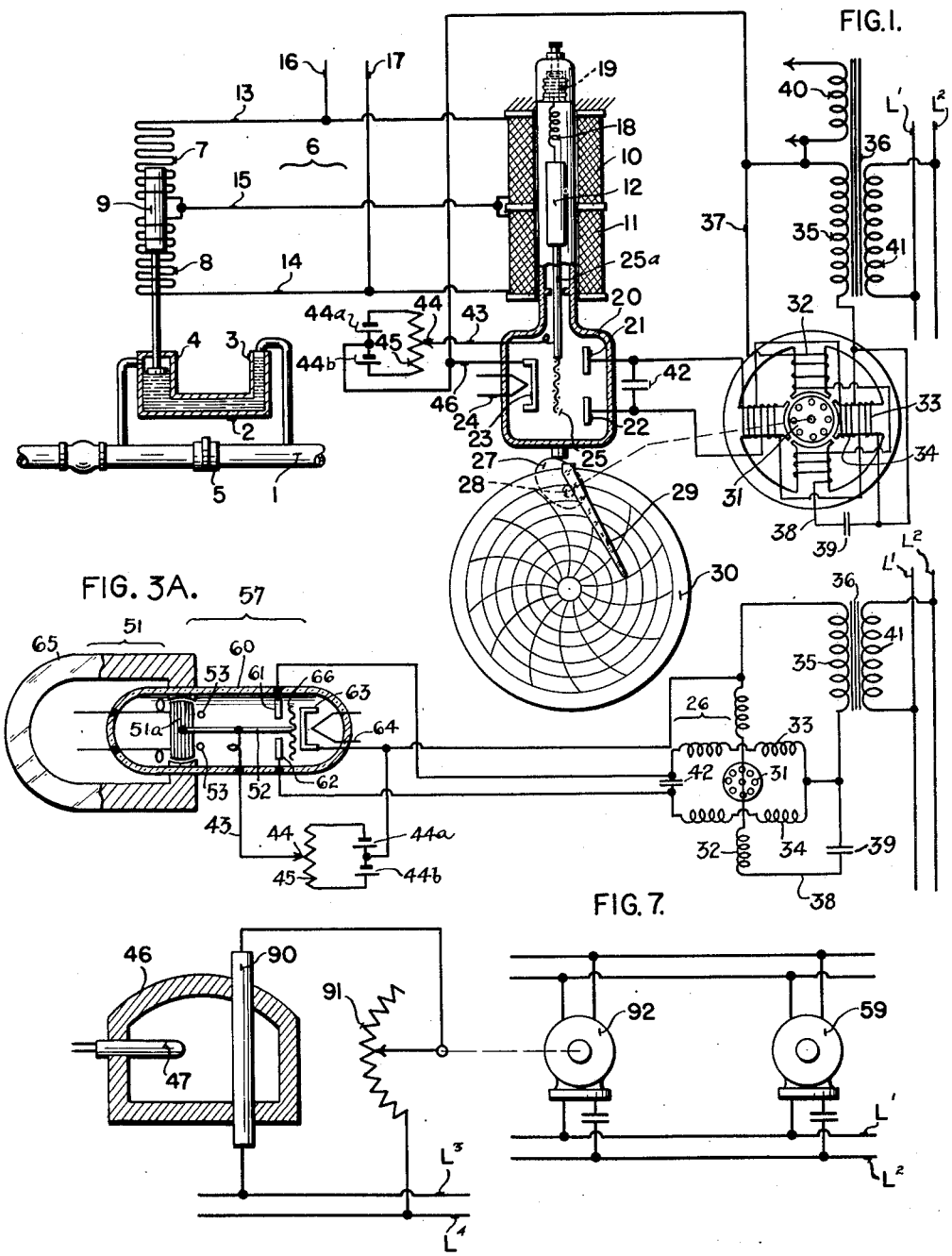
INVENTOR
EARL A. KEELER
BY George M. ......
ATTORNEY May 2, 1944.　　　　　E. A. KEELER　　　　　2,348,177
MEASURING AND CONTROL APPARATUS
Filed Jan. 17, 1939　　　　2 Sheets-Sheet 2
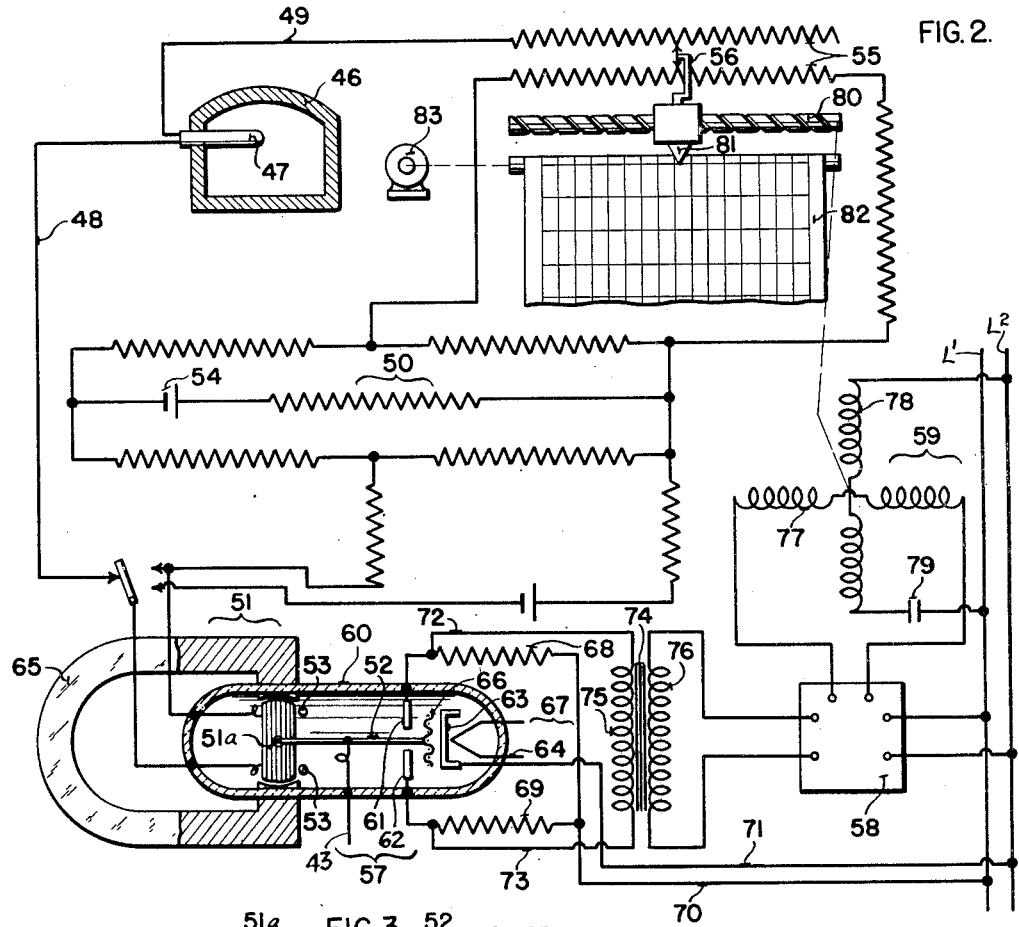
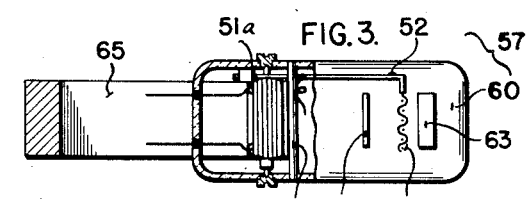
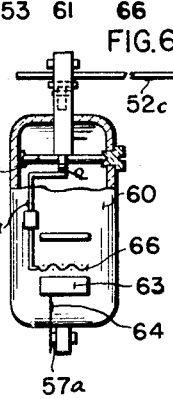
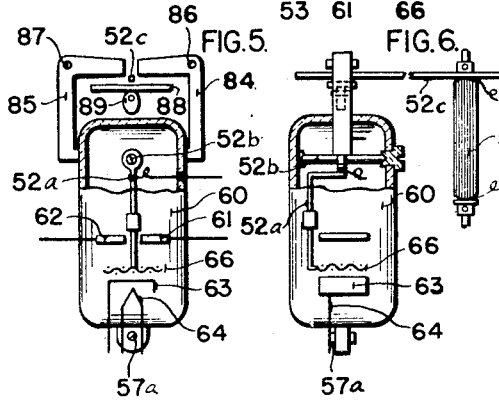
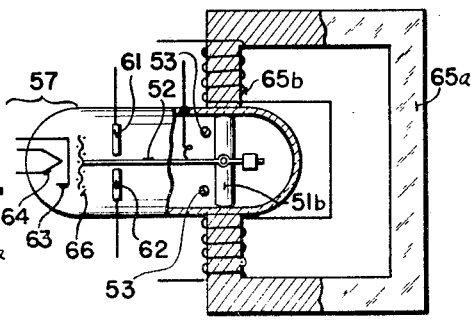
INVENTOR
EARL A. KEELER
BY
ATTORNEY Patented May 2, 1944

2,348,177

UNITED STATES PATENT OFFICE 2,348,177

MEASURING AND CONTROL APPARATUS

Earl A. Keeler, Norristown, Pa., assignor to The Brown Instrument Company, Philadelphia, Pa., a corporation of Pennsylvania Application January 17, 1939, Serial No. 251,303

19 Claims. (Cl. 171—95)

The present invention relates to instrumentalities useful in measuring and/or controlling a variable condition, and more particularly to instrumentalities utilizing electron discharge tubes and adapted to produce effects in accordance with the deflections of an element which deflects in accordance with variations in a control quantity or in a quantity to be measured, and in which because of the small magnitude of the element deflecting force it is not desirable, nor practicable, to have the said effects produced directly by the deflecting element.

A specific object of the invention is to provide a precision measuring instrument in which an element to be adjusted such as a recording pen, indicating pointer, or other exhibiting part of the instrument, is continuously regulated by a reversible electrical motor under control of a sensitive element deflecting in accordance with changes in the value of a quantity to be measured.

Another specific object of the invention is to provide an instrument adapted to produce recording and/or controlling effects in accordance with the deflections of a sensitive measuring device deflecting in accordance with changes in the value of a quantity under measurement and wherein the means for producing such effects are controlled by a normally balanced control circuit including an electron discharge tube of which a member carried by the sensitive measuring device comprises an element.

A further specific object of the invention is to provide an instrument including an electron discharge tube and an associated galvanometer for the measurement of small electric voltages.

A still further specific object of the invention is to provide improved means for transforming the deflections of a galvanometer coil or other sensitive deflecting instrument into substantial and corresponding variations of alternating or direct current, which variations may be employed to produce recording and/or controlling effects in accordance with said deflections.

In accordance with one embodiment of the present invention a control device and suitable means controlled thereby are provided for continuously regulating the adjustment of an indicating pointer, recording pen, control valve, rheostat or the like in response to unbalance of a normally balanced electrical network as indicated by a sensitive measuring device. The control device referred to comprises an electron discharge tube having a pair of anodes, a common cathode, and a control electrode the latter of which is adapted to be moved relatively to said anodes in accordance with the deflections of an element of the sensitive measuring device to thereby vary the relative magnitudes of the currents passed from each of the anodes to the common cathode of said tube. The means referred to above as controlled by the control device includes a reversible electrical motor having a forward and a reverse winding connected in circuit with a respective anode circuit of said valve and with a source of electric current. Thus, when the control electrode of said discharge tube is in a position wherein it permits the flow of substantially equal current values in both anode circuits, the motor will be actuated for rotation with equal force in both directions and will remain stationary. When the control electrode is moved in one direction from that position its effect on one anode circuit will increase and its effect on the other anode circuit will decrease with the result that one winding of the motor will be energized to a greater extent than the other and, accordingly, the motor will be energized for rotation in a corresponding direction. Movement of the control electrode in the opposite direction will produce energization of the motor for rotation in the opposite direction.

In a preferred embodiment of the invention, the moving coil of a galvanometer is mounted within the envelope of the electron discharge tube referred to and carries the control electrode of said tube on the end of a pointer rigidly fixed thereto. A reversible motor is selectively controlled for rotation in one direction or the other in accordance with the deflections of the galvanometer coil and, thus, may be employed to produce a desired control effect for modifying the characteristic of a condition to which the galvanometer is responsive. When the galvanometer coil is connected to the terminals of a normally balanced electrical network, for example, a null point potentiometric network, the motor rotation may be employed to rebalance the network on unbalance thereof, in which case the galvanometer pointer will be in such a position when the network is balanced that the control electrode will affect both anode circuits of said electron discharge tube equally and accordingly the motor will not be energized for rotation in either direction and will assume a position of rest.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Of the drawings:

Fig. 1 is a diagrammatic view illustrating one embodiment of the invention as adapted for use in measuring the flow of fluid through a conduit;

Fig. 2 illustrates a modification of the arrangement of Fig. 1 for use in measuring and recording the temperature in a furnace;

Fig. 3 illustrates in detail the construction of the electron discharge tube and galvanometer arrangement of Fig. 2;

Fig. 3A illustrates a modification of the arrangement of Fig. 2;

Figs. 4–6 illustrate further modifications of the arrangement of Fig. 2; and

Fig. 7 illustrates the use of the invention in a control system.

In Fig. 1 of the drawings an arrangement including an electron discharge tube to be described is illustrated for producing control effects in accordance with the deflections of an element which controls the electron discharge tube and deflects in accordance with variations in a quantity to be measured. Specifically, an arrangement is illustrated in Fig. 1 for measuring and recording the flow of fluid through a conduit 1 and, as shown, the invention is adapted to flow measurements in a system including a manometer 2 having opposed legs 3 and 4 preferably filled with mercury and upon the respective legs of each are impressed pressures correspondingly varying with the up and down stream pressures, respectively, across a measuring orifice 5 inserted in the conduit 1. I preferably measure the level variations by means including an inductance bridge network 6. The inductance bridge network 6 includes a pair of end to end coils 7 and 8 in the transmitter, placed one above the other, and an armature 9 of electro-magnetic material which is carried by a float which rests in the mercury in leg 4 and is adapted to be moved into and out of the coils in accordance with variations of the up and down stream pressure across the orifice. As the armature 9 is moved up and down the inductance of coil 7 is increased or decreased respectively relative to the inductance of the coil 8. The inductance bridge 6 also includes a pair of end to end coils 10 and 11 in the receiver which are placed one above the other and associated with an electro-magnetic armature 12 which is balanced against the activity of gravity in a manner described hereinafter. The coils 7 and 8 are so connected into the inductance bridge that when the movement of the armature 9 unbalances the inductance bridge by varying the inductance of coil 7 relative to that of the coil 8, the electromagnetic interaction between the armature 12 and the coils 10 and 11 will move the armature 12 upward or downward accordingly as the movement of the armature 9 is upward or downward, respectively, as required to balance the bridge.

To this end the remote ends of coils 10 and 11 are connected to the remote ends of coils 7 and 8 by conductors 13 and 14 and the point of engagement of the coils 10 and 11 is connected by a conductor 15 to the point of engagement of coils 7 and 8. The conductors 13 and 14 are connected by conductors 16 and 17 to the terminals of a suitable source of alternating current which source may be of commercial frequency. Coils 7 and 8 are preferably so relatively wound that the two coils are energized in the same direction, that is to say, the magnetic lines of force simultaneously produced by the current flow through the coils 7 and 8 pass in the same axial direction from the coil by which they are produced so that the magnetic poles created at the remote ends of the two coils are of opposite polarity as are the poles created at the adjacent ends of the coils. The coils 10 and 11 are preferably wound in the same manner.

As illustrated, the means for balancing the armature 12 against the activity of gravity includes a spring 18 secured at its upper end to a bellows 19 and connected at its lower end to the upper end of the armature 12. The bellows 19 comprises the seal for the upper end of the electron discharge tube referred to above and indicated by the reference numeral 20 and in the interior of which the armature 12 is adapted to move. The electron discharge tube 20 comprises a bulb like part at its lower end and at its upper end an elongated section in which the armature 12 is positioned and which section is inserted in the coils 10 and 11 and is adapted to be moved relatively thereto. The tube 20 is composed of suitable material, preferably of glass, and is exhausted to a high degree of vacuum and has rigidly mounted in any convenient manner in the bulb portion a pair of anodes 21 and 22 which are spaced apart but positioned in the same vertical plane, a cathode 23, and a heater filament 24. A control electrode 25 is carried on the end of a rod 25a which extends axially from the lower end of armature 12 and is rigid therewith and is adapted to be adjusted relatively to the anodes in accordance with the movements of armature 12 to thereby vary the conductivities of the separate paths from the anodes 21 and 22 to the common cathode 23. As shown, a bell and thumbscrew arrangement provided at the top of the electron discharge device 20 is provided for adjusting the expansion of the bellows and thereby the normal balanced position of the control electrode 25 relative to the anodes 21 and 22.

With the described connections and adjustments, when the armature 9 extends equally into the coils 7 and 8, the armature 12 will extend equally into the coils 10 and 11 and in those positions no current will flow through the bridge conductor 15 and the resultant force exerted on the armature 12 by coils 10 and 11 will be substantially zero. When the armature 9 moves upward from said intermediate position in response to a change in the flow in conduit 1, the inductance of the coil 7 is increased and the inductance of the coil 8 is decreased. This results in an increase in the potential across the coil 7 and a decrease in the potential across the coil 8 to thereby unbalance the bridge network 6. The resulting flow of current through the conductor 15 increases the energization of the coil 10 relative to that of the coil 11 to thereby effect the movement of the armature 12 in an upward direction. Such movement operates to rebalance the bridge network 6 and the armature 12 will come to rest at a position in which substantially no resultant magnetic force is exerted on it by coils 10 and 11.

When the control electrode 25 of tube 20 is in a position intermediate the anodes 21 and 22, the conductivities of the paths from each of the anodes to the common cathode 23 will be identical. This is the normal balanced position of the control electrode 25 relative to the anodes 21 and 22. On movement of the control electrode from that position in response to a change of flow through the conduit 1, however, for example, on movement upward, the conductivity of the paths including the anode 21 will decrease and that including the anode 22 will increase. Such unbalance is compensated for and the normal positional relation between the control electrode 25 and the anodes 21 and 22 is restored by means of a motor 26 which is connected in circuit with the anodes 21 and 22 and is adapted to be selectively energized for rotation in one direction or the other accordingly as the conductivity of one of said paths exceeds that of the other.

As illustrated, a mechanical connection may desirably be provided as shown, between the armature of motor 26 and the electron discharge tube 20 so that on movement of the control electrode 25 from its normal position intermediate the anodes 21 and 22 the tube 20 will be moved bodily with respect to coils 10 and 11 in the direction to restore the normal positional relation between the anodes 21 and 22 and the control electrode 25. The mechanical connection referred to may advantageously take the form of a suitably configured cam 27 connected to the shaft 28 of motor 26 and on the edge of which the tube 20 is supported and is adapted to be moved in an upward and downward direction as the cam is rotated in one direction or the other, as required to restore the control electrode 25 to its normal balanced position. It is noted that movement of the armature 12 in response to a change in the flow through conduit 1 will operate to compress or elongate the spring 18, but that subsequent compensating movement of the tube 20 will restore the length of the spring to a predetermined normal length. Thus, in the balanced condition of the system, the armature 12 will assume a position in which the forces of magnetic or terrestrial origin acting on it are both balanced out.

It will be apparent that by suitably shaping the edge of cam 27, the movement of the tube 20 and thereby the armature 12 may have any desired relation to the angular rotation of the cam 27. If desired, a pen arm 29 may be mounted for rotation on the same shaft on which the cam 27 is mounted and arranged in cooperative relation with a suitably calibrated chart 30 for recording the changes in the flow through the conduit 1. The chart 30 is of the circular type and is continuously rotated at constant speed in a clockwise direction by means not shown so that when the pen arm is rotated by the shaft 28 in response to movements of the armature 12 a line will be traced on the chart to record such movements.

The reversible motor 26 is of the induction variety and includes a squirrel cage rotor 31 and two pairs of oppositely disposed field poles on which windings 32, 33 and 34 are wound. Winding 32 is wound on one pair of said field poles and is connected to the terminals of the high voltage secondary winding 35 of a transformer 36 by conductors 37 and 38 in the latter of which a condenser 39 is inserted so that the current which flows through this winding will lead the current of the transformer winding 35 by approximately 90°. The transformer also includes a low voltage secondary winding 40 and a line voltage primary winding 41 having its terminals connected to the supply conductors L¹ and L². The low voltage winding 40 is connected to the terminals of the filament 24 of tube 20 by conductors not shown, and supplies energizing current thereto. Windings 33 and 34 are wound on the other pair of said field poles, one half of winding 33 being wound on a portion of one of the field poles which is adjacent the rotor 31 and the other half of which is wound on a portion of the other field pole remote from said rotor. Similarly, one half of winding 34 is wound on a portion of the last mentioned pole which is adjacent the rotor 31 and the other half of winding 34 is wound on a portion of the first mentioned pole remote from said rotor.

The anodes 21 and 22 of the electron discharge tube 20 are connected in circuit with the respective windings 33 and 34 of the motor 26 and the transformer secondary winding 35. As illustrated, the cathode 23 is connected to one terminal of the transformer winding 35 and the other terminal of the latter is connected to one end of each of the motor windings 33 and 34. The remaining ends of the windings 33 and 34 are connected to a respective anode 21 and 22 so that the winding 33 is energized by the current conducted from anode 21 to the cathode 23 and the winding 34 is energized by the current conducted from anode 22 to the cathode 23. Windings 33 and 34 are so wound on motor 26 with respect to the manner in which winding 32 is wound thereon that, when said windings 33 and 34 are equally energized, the rotor 31 will not be actuated for rotation in either direction and will remain stationary, but when one winding is energized to a greater extent than the other the motor will be actuated for rotation in one direction or the other accordingly. That is to say, when the conductivity of the path from the anode 21 to the cathode 23 is substantially identical to that from the anode 22 to the cathode, the torque developed by the winding 33 for producing rotation of the rotor 31 will be equal and opposite to the torque developed by the winding 34 and consequently the rotor 31 will remain stationary. When the relative conductivity of the said paths is varied, however, the torque developed by the winding 33 will vary with respect to the torque developed by the winding 34 and accordingly the rotor 31 will be actuated for rotation in one direction or the other. A condenser 42 may desirably be connected between the anodes 21 and 22 for increasing the torque developed by motor 26.

As illustrated, the control electrode 25 is connected by a conductor 43 to a contact 44 which is adjustable along a resistance 45 which resistance has its terminals connected to the terminals of a pair of batteries 44a and 44b connected so as to assist each other. The cathode 23 of tube 20 is connected by a conductor 46 to the point of engagement of said batteries. By adjustment of the contact 44 along resistance 45, the potential of the control electrode 25 may be adjusted to an optimum value so that on movement of the control electrode 25 from a position intermediate the anodes 21 and 22 a maximum change in current flow through the motor windings 33 and 34 will be effected.

It will be apparent that the current conducted through the separate anode paths of the electron discharge tube 20 may be amplified, if desired, instead of directly applied to the windings of motor 26 and the amplified quantities applied to the windings for selectively controlling the motor for rotation, for example, as shown in connection with Fig. 2 described hereinafter.

In Fig. 2, I have illustrated, more or less diagrammatically, a modification of the arrangement of Fig. 1, which modification is especially adapted for measuring and recording the temperature of the interior of a furnace 46. Specifically, a thermocouple 47 is arranged in the interior of the furnace 46 and the terminals of the thermocouple are connected by conductors 48 and 49 to the terminals of a null point potentiometric network 50 which network may be of any suitable type such as the Brown potentiometric circuit disclosed in Patent 1,898,124 issued February 21, 1933, to Thomas R. Harrison. The moving coil 51a of a galvanometer 51 equipped with a pointer 52 is connected in the conductor 48 and fixed stops 53 are desirably provided for limiting the deflection of the pointer 52.

The potentiometric circuit 50 is of a well-known type, and it is sufficient for the present purposes to note that the potentiometric circuit includes a circuit branch including the thermocouple 47, an opposing circuit branch including a source of known potential such as a battery 54 and resistors 55, a variable portion of which may be connected into the opposed branches by means of a sliding contact 56 whereby the respective effects of the variable and known sources are made equal and opposite, and the galvanometer moving coil is thus rendered undeflected when the circuit is balanced for a given value of the E. M. F. of the thermocouple 47 with the contact 56 in a corresponding position along resistors 55. The position of the contact 56 is then a measure of the value of the thermocouple E. M. F. and, as will be clear, may serve as a measure of the temperature to which the thermocouple is exposed.

In the embodiment illustrated in Fig. 2, my invention is specifically concerned with the means by which the contact 56 is adjusted back and forth along resistors 55 in response to galvanometer deflection, and as shown, includes an electron discharge tube 57, an electronic amplifier 58, and a reversible electrical motor 59 the rotation and direction of rotation of which is selectively controlled in accordance with the galvanometer deflection. Motor 59 is connected in any convenient manner to contact 56 for adjusting the latter along resistors 55, and thereby effects rebalance of the potentiometric network 50 in response to a change in the E. M. F. of thermocouple 47.

The manner in which deflection of the galvanometer 51 from a predetermined position operates to control the rotation and direction of rotation of motor 59 and thereby adjustment of the contact 56 along resistors 55 in response to potentiometer unbalance is best described by considering Fig. 3 in connection with Fig. 2. As illustrated, the moving coil of galvanometer 51 is mounted in the interior of the electron discharge tube 57 which tube comprises an envelope 60 of suitable material, preferably of glass and exhausted to a high degree of vacuum and in which a pair of spaced anodes 61 and 62, a cathode 63, and a heater filament 64 are rigidly mounted in any convenient manner at one end. The moving coil of the galvanometer 51 is mounted in any convenient manner in the other end of the envelope 60 and, as shown, is positioned between the poles of a U-shaped permanent magnet 65 which is exterior of the envelope. A control electrode 66 positioned between the cathode 63 and the anodes 61 and 62 is carried on the end of the galvanometer pointer 52 which, as shown, extends in the direction of the anodes 61 and 62 and the cathode 63. The potential of the control electrode 66 may be controlled in the same manner that the potential of the control electrode 25 of Fig. 1 is controlled, or if desired, the control electrode 66 may be employed as a baffle to physically, rather than electrically, prevent the flow of current between the anodes 61 and 62 and the cathode 63. The control electrode 66 is adapted to be moved relatively to the anodes 61 and 62 on deflection of the said pointer to thereby vary the relative conductivities of the paths from the anodes 61 and 62 to the cathode 63.

The anodes of tube 57 may be connected directly to the terminals of the windings of a motor 26 as shown in Fig. 3A to control the rotation and direction of rotation of the motor and thereby rebalancing of the potentiometer, or an alternative arrangement, as shown in Fig. 2 may be employed in which the anode circuits of tube 57 are connected in two opposed arms of a Wheatstone bridge network 67, the remaining arms of which are made up of fixed resistances 68 and 69. The energizing terminals of the bridge network comprising the cathode 63 of tube 57 and the point of engagement of resistances 68 and 69 are connected by conductors 70 and 71, respectively, to the alternating current supply lines $L^1$ and $L^2$.

The equalizing or balancing terminals of the bridge network are connected by conductors 72 and 73 to the terminals of the primary winding 75 of a transformer 74 having a secondary winding 76. The transformer secondary winding 76 has its terminals connected to the input circuit of the electronic amplifier 58 and the output terminals of the latter are connected to one phase winding 77 of the motor 59 which is shown as of the rotating field induction type. The motor also includes a second winding 78 which is connected to the alternating current supply lines $L^1$ and $L^2$ through a suitable condenser 79. The operation of the motor 59 is fundamentally the same as that of the motor 26 of Fig. 1 and it is sufficient for the present purposes to note that when the output voltage of amplifier 58 is substantially in phase with the line voltage the motor 59 will be actuated for rotation in one direction and when the said output voltage is displaced substantially 180° with respect to the line voltage the motor will be actuated for rotation in the opposite direction.

When the potentiometric network 50 is balanced, the galvanometer pointer will be in a position such that the control electrode 66 is intermediate the anodes 61 and 62, and the bridge network 67 will then also be in a balanced condition. On the occurrence of a change in the temperature of furnace 46, however, and consequently, on unbalance of the potentiometric network 50, the galvanometer pointer 52 will deflect in one direction or the other and as a result an unbalanced alternating voltage, which is in phase or displaced 180° in phase with respect to the line voltage, will be impressed on the input circuit of amplifier 58. Thus, when the bridge network 67 is unbalanced as a result of deflection of the galvanometer pointer 52 in one direction or the other, an alternating voltage of one polarity or the other with respect to the line voltage will be impressed on the motor winding 77 to cause rotation of the motor 59 in a corresponding direction.

As illustrated, the shaft of motor 59 is connected in any convenient manner to a shaft 80 which may desirable be a rod having a spiral groove thereon, and the potentiometer contact is mounted on a carriage carried by shaft 80 and is arranged to move in one direction or the other as shaft 80 rotates. Thus, when motor 59 is energized for rotation as a result of a change in voltage generated in thermocouple 47, the motor effects an adjusting movement of the contact 56 along resistors 55 to rebalance the potentiometric network 50 and restore the galvanometer pointer 52 to its normal undeflected position and thereby rebalance the bridge network 67. When the bridge network 67 is again balanced the motor 59 will come to rest with the contact 56 at a new position along the slidewire resistors 55, which position will then provide a measure of the temperature to which the thermocouple 47 is exposed.

Desirably, a pen 81 mounted in the carriage which carries the potentiometer rebalancing contact 56 is arranged to cooperate with a recorder chart 82 and to thereby provide a continuous record of the temperature of the interior of furnace 46. The recorder chart is arranged to be driven in any convenient manner, as, for example, by a unidirectional motor 83 through suitable gearing (not shown) so that a record of the temperature of the interior of furnace 46 will be had as a continuous line on the chart 82.

In Figs. 4–6 I have illustrated, more or less diagrammatically, modified forms of the electron discharge tube 57 of Fig. 2, which modified forms may be employed in lieu of the tube 57 of Fig. 2 to control the selective operation of the reversible motor 59 for rebalancing the potentiometric network 50.

In the modifications shown in Fig. 4 the galvanometer pointer 52 is carried by a magnetic core member 51b which is mounted for rotation in the electron discharge tube 57 in any convenient manner and positioned between the poles of an electromagnet 65a exterior of the tube 57. The electromagnet 65 comprises a U-shaped member which may be composed of soft iron or other suitable material and a winding 65b wound thereon. The winding 65b has its terminals connected to the potentiometric network 50 in lieu of the moving coil 51a of Fig. 2 and on potentiometer unbalance in one direction or the other produces magnetic fluxes in the member 65a which are effective to deflect the core member 51b against the opposing action of a spring (not shown) in a corresponding direction. Such deflection operates, as in the arrangement of Fig. 2, to control the actuation of the reversible motor 59 and thereby the rebalancing operation of the potentiometric network 50.

In the modification illustrated in Figs. 5 and 6 the position of the control electrode 66 relatively to the anodes 61 and 62 is controlled by means of a galvanometer 51a which is totally exterior of the electron discharge tube 57. As shown, the control electrode 66 is carried on the end of a weighted pendulum 52a which is pivoted in the tube 57 at the point 52b in any convenient manner, and extends vertically downward due to the action of gravity. The tube 57, in turn, is pivoted at one end at the point 57a and is adapted to be deflected about said pivot under control of the galvanometer pointer 52c.

In this embodiment the electron discharge tube 57 is normally maintained in the upright position shown by means of a pair of bell-cranks 84 and 85 which are pivoted at points 86 and 87, respectively, and the vertical arms of which are normally in engagement with the opposite sides of the envelope 60. The end of the galvanometer pointer 52c is disposed in cooperative relation with the horizontal arms of the bell-cranks 84 and 85 and is adapted to be periodically raised toward and lowered away from the horizontal arms of the said bell-cranks under the control of a depressor bar 88 which, in turn, is actuated by a suitably configured cam 89 on which the depressor bar rests and which is rotated at constant speed by any suitable means (not shown). When the galvanometer pointer 52c is in its normal position it will not engage either bell-crank when moved upward, but when it is deflected in one direction or the other from said normal position it will engage one or the other of the bell-cranks, accordingly, to thereby produce deflection of the electron discharge tube about its pivot point 57a in a corresponding direction. The anodes 61 and 62 and the cathode 63 of tube 57 are rigid with the said tube and, as will be apparent, will move relatively to the control electrode 66, which because it is carried by the freely hanging pendulum 52a, will remain in the position shown. Such relative movement of the anodes 61 and 62 and the control electrode 66 will vary the relative conduction of the circuit paths from the anodes 61 and 62 to the cathode 63 which changes in conduction may be employed in the manner described in connection with Fig. 1 or Fig. 2 to selectively control the direction of rotation of a reversible electrical motor 26 or 59 and thereby the rebalancing operation of the potentiometric network 50.

When the depressor bar 88 is lowered the galvanometer pointer 52c will be released whereupon the electron discharge tube 57 will move under the weight of the bell-cranks 84 and 85 back to its normal vertical position thereby restoring the normal positional relation between the anodes 61 and 62 and the control electrode 66 and consequently deenergizing the motor 59 for rotation. Obviously suitable spring or other means may be employed to normally maintain the tube 57 in said vertical position and to return the tube to that position on deflection therefrom after the galvanometer pointer 52c has been released, if desired. The actuation of the motor 59 in its rebalancing action is thus seen to be intermittent in this modification and will be periodically energized until the potentiometric network 50 is exactly balanced and the galvanometer pointer 52c assumes a normal balanced position intermediate the bell-cranks 84 and 85.

It will be apparent the motor 26 of Fig. 1 or 59 of Fig. 2 may be employed to operate a control valve or rheostat for governing the flow of fluid through the conduit 1, or the application of an agent to the furnace 46 of Fig. 2 or another motor desirably operated together with motor 26 or 59 may be so employed. For example, as shown in Fig. 7 a furnace 46 to the temperature of which thermocouple 47 is responsive is heated by a resistor 90 which is connected to electrical supply conductors $L^3$ and $L^4$ through a rheostat 91 the adjustment of which is effected by a motor 92. The motor 92 may be exactly like the motor 59, and, as shown, is connected in parallel therewith. The mechanical connection of the rheostat 91 to the motor 92 is such as to decrease and increase the supply of electric current to the resistor 90 as the temperature of furnace 46 rises above or falls below a predetermined level.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention what I claim as new and desire to secure by Letters Patent is:

1. Measuring apparatus including a galvanometer having a movable coil connected to a voltage to be measured, an electron discharge tube having a pair of spaced anodes, a cathode and a control electrode, said control electrode being adapted to be moved relatively to said anodes in accordance with the movements of the movable coil of said galvanometer, means to indicate the magnitude of said voltage, and means differentially connected to said anodes and cathode to control said indicating means.

2. Measuring apparatus including a galvanometer having a movable coil connected to a voltage to be measured and a pointer rigid with said coil, an electron discharge tube having a pair of spaced anodes, a cathode and a control electrode, said control electrode being adapted to be positioned relatively to said anodes under control of said galvanometer pointer, means to indicate the magnitude of said voltage, and means differentially connected to said anodes and cathode to control said indicating means.

3. Measuring apparatus including an electron discharge tube having a pair of spaced anodes, a cathode and a control electrode, a galvanometer having a movable coil connected to a voltage to be measured and mounted in said electron discharge tube, a pointer mounted on said coil and adapted to be deflected from a predetermined position in accordance with the deflections of said coil, a mechanical connection between said pointer and said control electrode, means to indicate the magnitude of said voltage, and means differentially connected to said anodes and cathode to control said indicating means.

4. Measuring apparatus including a galvanometer having a movable coil connected to a voltage to be measured and a pointer rigid with said coil, an electron discharge tube having a pair of spaced anodes, a cathode and a control electrode, said control electrode being adapted to be positioned relatively to said anodes under control of said galvanometer pointer, means to indicate the magnitude of said voltage, and reversible motor means differentially connected to said anodes and cathode to control said indicating means.

5. Measuring apparatus including a galvanometer having a movable coil connected to a voltage to be measured, an electron discharge tube having a pair of spaced anodes, a cathode and a control electrode, said anodes and control electrode being adapted to be moved relatively to each other in accordance with the movements of said galvanometer coil, means to indicate the magnitude of said voltage, a source of energizing current, and reversible motor means connected to said energizing source, said anodes and cathode to control said indicating means, said reversible motor means including a forward winding connected in circuit with said energizing source, said cathode and one of said anodes, and a reverse winding connected in circuit with said energizing source, said cathode and the other of said anodes.

6. Measuring apparatus including a potentiometric network having a source of standard voltage and an opposed source of unknown voltage, a device responsive to the resultant of said voltages, a bridge network, energizing means for said bridge network, a pair of electrodes included in said bridge network and subjected to different potentials, the space between said electrodes forming a resistance portion of said bridge network, a third electrode disposed adjacent the first mentioned electrodes and movable relatively thereto under control of said device to unbalance said bridge network proportionally to the potentiometric unbalance, relay means responsive to bridge network unbalance to rebalance said potentiometric network, and measuring means controlled by said relay means.

7. Measuring apparatus including a potentiometric network having a source of standard voltage and an opposed source of unknown voltage, an electron discharge tube having an anode, a cathode and a control electrode, a bridge network one arm of which includes the space path resistance between said anode and cathode, a galvanometer responsive to the resultant of said voltages and adapted to move said control electrode relatively to said anode to unbalance said bridge network in response to potentiometer unbalance, relay means responsive to bridge network unbalance to rebalance said potentiometric network, and measuring means controlled by said relay means.

8. Measuring apparatus including a potentiometric network having a source of standard voltage and an opposed source of unknown voltage, an electron discharge tube having a pair of spaced anodes, a cathode and a control electrode, a bridge network one arm of which includes the space path resistance between one of said anodes and said cathode and an opposed arm of which includes the space path resistance between the other of said anodes and said cathode, a galvanometer responsive to the resultant of said voltages to control the position of said control electrode relatively to said anodes and thereby to unbalance said bridge network, relay means responsive to bridge network unbalance to rebalance said potentiometric network, and measuring means controlled by said relay means.

9. Measuring apparatus including a potentiometric network having a source of standard voltage and an opposed source of unknown voltage, an electron discharge tube having a pair of spaced anodes, a cathode and a control electrode, a bridge network one arm of which includes the space path resistance between one of said anodes and said cathode and an opposed arm of which includes the space path resistance between the other of said anodes and said cathode, a galvanometer responsive to the resultant of said voltages and having a movable coil mounted within said electron discharge tube, a rigid connection between said galvanometer coil and said control electrode, relay means connected to said bridge network and adapted on movement of said control electrode relatively to said anodes in response to potentiometric network unbalance to rebalance said potentiometric network, and measuring means controlled by said relay means.

10. Measuring apparatus including a normally balanced electrical network adapted to be unbalanced in accordance with variations in a variable condition to be measured, an electron discharge device having a plurality of electrodes, a device responsive to unbalance of said network to physically move one of said electrodes relatively to another of said electrodes, means to rebalance said electrical network on unbalance thereof, and means connected to said electrodes to control said rebalancing means.

11. Measuring apparatus including a potentiometric network having a source of standard voltage and an opposed source of unknown voltage, an electron discharge device having a plurality of electrodes, a device responsive to the resultant of said voltages to physically move one of said electrodes relatively to another of said electrodes, means to rebalance said potentiometric network on unbalance thereof, and means connected to said electrodes to control said rebalancing means.

12. Measuring apparatus including a galvanometer having a movable coil connected to a voltage to be measured and a pointer rigid with said coil, an electron discharge tube having a pair of spaced anodes, a cathode and a control electrode, said control electrode being adapted to be positioned relatively to said anodes under control of said galvanometer pointer, means to indicate the magnitude of said voltage, reversible motor means having a forward and a reverse winding to control said indicating means, a circuit including said forward winding, said cathode and one of said anodes, and a circuit including said reverse winding, said cathode and the other of said anodes.

13. Measuring apparatus including a device responsive to changes in a variable condition to be measured, an electron discharge tube having a pair of spaced anodes, a cathode and a control electrode, means under control of said device to move said anodes and control electrode relatively to each other, means to indicate the magnitude of said condition, reversible rotatable motor means adapted to be selectively energized for rotation in one direction or the other to control said indicating means, and electrical circuit means permanently connected to said reversible motor means and to said anodes and cathode to control the energization of said reversible motor means.

14. Measuring apparatus including a device responsive to changes in a variable condition to be measured, an electron discharge tube having an anode, cathode and a control electrode, means under control of said device to move said anode and cathode relatively to each other, means to indicate the magnitude of said condition, reversible rotatable motor means adapted to be selectively energized for rotation in one direction or the other to control said indicating means, and electrical circuit means permanently connected to said reversible motor means and to said anode and cathode to control the energization of said reversible motor means.

15. Measuring apparatus including a galvanometer having a movable coil connected to a voltage to be measured and a pointer rigid with said coil, an electron discharge tube having a pair of spaced anodes, a cathode and a control electrode, said control electrode being adapted to be positioned relatively to said anodes under control of said galvanometer pointer, means to indicate the magnitude of said voltage, reversible motor means adapted to be selectively energized for operation in one direction or the other to control said indicating means, and electrical circuit means permanently connected to said reversible motor means and to said anodes and cathode to control the energization of said reversible motor means, said electrical circuit means being differentially connected to said anodes and cathode.

16. Measuring apparatus including a galvanometer having a movable coil connected to a voltage to be measured and a pointer rigid with said coil, an electron discharge tube having a pair of spaced anodes, a cathode and a control electrode, said control electrode being adapted to be positioned relatively to said anodes under control of said galvanometer pointer, means to indicate the magnitude of said voltage, a source of alternating current, reversible induction motor means to control said indicating means, said reversible induction motor means having field producing means continuously energized from said source of alternating current and having additional field producing means adapted to be selectively energized to produce operation of said motor in one direction or the other, and electrical circuit means energized by said source of alternating current and permanently connected to the additional field producing means of said reversible motor means and to said anodes and cathode to control the operation of said reversible motor means, said electrical circuit means being differentially connected to said anodes and cathode.

17. Measuring apparatus including a device responsive to changes in a variable condition to be measured, an electron discharge tube having an anode, cathode and a control electrode, means under control of said device to move said anode and control electrode relatively to each other, means to indicate the magnitude of said condition, and means connected to said anode and cathode to control said indicating means and to move said anode and control electrode relatively to each other to restore them to substantially their original relative positions.

18. Measuring apparatus including a device responsive to changes in a variable condition to be measured, an electron discharge tube having a pair of spaced anodes, a cathode and a control electrode, means under control of said device to move said control electrode and anodes relatively to each other, means to indicate the magnitude of said condition, means differentially connected to said anodes and cathode to move said control electrode and anodes relatively to each other to restore them to substantially their original relative positions, and a mechanical connection between said last-mentioned means and said indicating means.

19. Measuring apparatus including a self balancing electrical network, means to unbalance said network in response to variations in a variable condition, an electron discharge device having a plurality of electrodes, means responsive to unbalance of said network to physically move one of said electrodes relatively to another of said electrodes, means to indicate the magnitude of said condition, and means connected to said electrodes to control said indicating means and to physically move said electrodes relatively to each other to restore them to substantially their original relative positions.

EARL A. KEELER.